(12) United States Patent
Saida

(10) Patent No.: US 9,308,964 B2
(45) Date of Patent: Apr. 12, 2016

(54) BICYCLE MOTOR CONTROL SYSTEM

(75) Inventor: Takao Saida, Osaka (JP)

(73) Assignee: Shimano Inc., Osaka (JP)

(*) Notice: Subject to any disclaimer, the term of this patent is extended or adjusted under 35 U.S.C. 154(b) by 520 days.

(21) Appl. No.: 13/155,621

(22) Filed: Jun. 8, 2011

(65) Prior Publication Data

US 2012/0316709 A1    Dec. 13, 2012

(30) Foreign Application Priority Data

Jun. 11, 2010   (JP) .................................. 2010-134552

(51) Int. Cl.
| | |
|---|---|
| *B62M 6/50* | (2010.01) |
| *G05B 19/00* | (2006.01) |
| *H02P 1/00* | (2006.01) |
| *B62M 6/45* | (2010.01) |
| *B60L 7/12* | (2006.01) |

(Continued)

(52) U.S. Cl.
CPC .. *B62M 6/45* (2013.01); *B60L 7/12* (2013.01); *B60L 7/26* (2013.01); *B60L 11/007* (2013.01); *B60L 11/1862* (2013.01); *B60L 11/1877* (2013.01); *B60L 2200/12* (2013.01); *B60L 2220/16* (2013.01); *B60L 2220/44* (2013.01); *B60L 2240/421* (2013.01); *B60L 2240/461* (2013.01); *B60L 2240/80* (2013.01); *Y02T 10/642* (2013.01); *Y02T 10/7005* (2013.01); *Y02T 10/705* (2013.01); *Y02T 10/7044* (2013.01); *Y02T 90/16* (2013.01)

(58) Field of Classification Search
USPC ................. 180/205, 206.1–206.7, 207, 220
See application file for complete search history.

(56) References Cited

U.S. PATENT DOCUMENTS

| | | | |
|---|---|---|---|
| 6,320,336 B1* | 11/2001 | Eguchi .......................... | 318/139 |
| 2004/0207262 A1* | 10/2004 | Yanagida et al. ............ | 307/10.1 |
| 2009/0306841 A1* | 12/2009 | Miwa et al. ..................... | 701/22 |

FOREIGN PATENT DOCUMENTS

| | | |
|---|---|---|
| DE | 197 36 611 A1 | 10/1998 |
| EP | 0 738 653 A2 | 10/1996 |

(Continued)

OTHER PUBLICATIONS

Ezio Bassi et al.; "Powerline Communication in Electric Vehicles"; Jun. 2009; Florida, USA pp. 1749-1753; IEEE 978-1-4244-4452-2/09.

(Continued)

*Primary Examiner* — Eduardo Colon Santana
*Assistant Examiner* — Said Bouziane
(74) *Attorney, Agent, or Firm* — Global IP Counselors

(57) ABSTRACT

A motor bicycle control system is provided for controlling a motor for assisting rotation of a bicycle wheel. The bicycle motor control system includes a motor communication part and a first mode switching part. The motor communication part performs power line communication with an electrical bicycle component and that changes a motor operation mode of the motor. The first mode switching part is operated either by electrical power supplied via a power line through which the motor communication part performs power line communication, or by electrical power obtained from a generator. The first mode switching part switches the motor operation mode from a motor driving mode in which the motor assist in rotating the bicycle wheel to a motor power generating mode in which the motor outputs electrical power that has been generated using rotation of the bicycle wheel according to a state of communication with the electrical component.

16 Claims, 10 Drawing Sheets

(51) Int. Cl.
  *B60L 7/26* (2006.01)
  *B60L 11/00* (2006.01)
  *B60L 11/18* (2006.01)

(56) References Cited

FOREIGN PATENT DOCUMENTS

| EP | 0 798 204-V1 | | 10/1997 |
|---|---|---|---|
| EP | 798204 A1 | * | 10/1997 |
| EP | 1 886 913 A2 | | 2/2008 |
| EP | 1886913 A3 | * | 2/2010 |
| JP | 6-101881 B2 | | 12/1994 |
| JP | 2000-6878 A | | 1/2000 |
| JP | 2001-122181 A | | 5/2001 |
| JP | 2001122181 A | * | 5/2001 |
| JP | 2003-174787 A | | 6/2003 |
| JP | 2005-525968 A | | 9/2005 |
| JP | 2005-304283 A | | 10/2005 |
| JP | 2005304283 A | * | 10/2005 |
| JP | 2006-015887 A | | 1/2006 |
| JP | 2006-62616 A | | 3/2006 |
| JP | 3849451 B2 | | 11/2006 |
| JP | 4016714 B2 | | 12/2007 |

OTHER PUBLICATIONS

European Search Report of corresponding EP Application No. 11 16 6766.3 dated Jul. 8, 2011.

* cited by examiner

BICYCLE MOTOR CONTROL SYSTEM

CROSS-REFERENCE TO RELATED APPLICATIONS

This application claims priority under 35 U.S.C. §119 to Japanese Patent Application No. 2010-134552, filed Jun. 11, 2010. The entire disclosure of Japanese Patent Application No. 2010-134552 is hereby incorporated herein by reference.

BACKGROUND OF THE INVENTION

1. Field of the Invention

The present invention relates to a bicycle motor control system, and in particular to a bicycle motor control system for controlling a motor for assisting rotation of a bicycle wheel.

2. Background Information

There are known in the art power-assisted bicycles, in which human-powered driving of a bicycle is assisted by an electric motor (for example, see JP-A 2005-304283). In a conventional power-assisted bicycle of such description, when the rider selects the assist mode, the driving force applied by the rider is assisted by an electric motor. In contrast, when the rider selects the regenerative charging mode, electrical power obtained from the electric motor is fed to a battery, whereby the battery is regeneratively charged.

SUMMARY

In a conventional power-assisted bicycle, in a circumstance in which, e.g., the amount of charge in the battery becomes insufficient, the control system for controlling the motor operation mode becomes unable to issue various types of commands, and the motor operation mode cannot be switched. Therefore, in a circumstance in which the amount of charge in the battery becomes insufficient, or in similar circumstances, there is a possibility that the motor operation mode will not have been set to the appropriate operation mode.

One object of the present disclosure is to provide a system in which the motor operation mode can be set to the appropriate operation mode.

In accordance with a first aspect of the present disclosure, a bicycle motor control system is proposed for controlling a motor for assisting rotation of a bicycle wheel that basically comprises a motor communication part and a first mode switching part. The motor communication part performs power line communication with an electrical bicycle component and that changes a motor operation mode of the motor. The first mode switching part is operated either by electrical power supplied via a power line through which the motor communication part performs power line communication, or by electrical power obtained from a generator. The first mode switching part switches the motor operation mode from a motor driving mode in which the motor assist in rotating the bicycle wheel to a motor power generating mode in which the motor outputs electrical power that has been generated using rotation of the bicycle wheel according to a state of communication with the electrical component.

In power line communication, the power line and a communication line share a common line. An information signal having a higher frequency than a power signal is impressed on the power signal, thereby making it possible to communicate both electrical power and information. Therefore, in a circumstance in which the power signal is lost, i.e., in a circumstance in which supply of electrical power is stopped, electrical power communication itself is discontinued. In other words, if power line communication is being performed, it is possible to determine that electrical power and information are being supplied. According to the first aspect, the first mode switching part thereby dynamically switches the motor operation mode from the motor driving mode to the motor power generating mode according to the state of communication with the electrical component, and therefore the motor operation mode can be set as appropriate.

In accordance with a second aspect of the present disclosure, the bicycle motor control system of the first aspect is further provided with a rotation detecting part for detecting a state of rotation of the bicycle wheel. The first mode switching part switches the motor operation mode from the motor driving mode to the motor power generating mode according to the state of communication with respect to the electrical component and the state of rotation of the bicycle wheel. In this circumstance, the first mode switching part uses the state of rotation of the wheel to determine the state of generation of power necessary for switching the operation mode, i.e., the state of power generation of the motor. The motor operation mode can thereby be switched from the motor driving mode to the motor power generating mode as appropriate.

In accordance with a third aspect of the present disclosure, the bicycle motor control system of the first or second aspect is further configured such that the first mode switching part switches the motor operation mode from the motor driving mode to the motor power generating mode in a circumstance in which communication with respect to the electrical component is disabled. According to the aspect described above, in a circumstance in which communication with the electrical component is disabled, i.e., in a circumstance in which supply of electrical power to the motor is stopped, the motor operation mode can be dynamically switched from the motor driving mode to the motor power generating mode, and the motor operation mode can therefore be set as appropriate.

In accordance with a fourth aspect of the present disclosure, the bicycle motor control system of any of the first through third aspects is further configured such that the first mode switching part switches the motor operation mode from the motor driving mode to the motor power generating mode in a circumstance in which communication with respect to the electrical component is disabled and the speed of rotation of the wheel is greater than a predetermined speed of rotation. According to the aspect described above, in a circumstance in which communication with the electrical component is disabled, e.g., in a circumstance in which the supply of electrical power to the motor is stopped and the speed of rotation of the wheel is greater than the predetermined speed of rotation, the motor operation mode is dynamically switched from the motor driving mode to the motor power generating mode. In other words, in a circumstance in which, e.g., operation in the motor power generating mode using electrical power from the motor can be performed in a stable manner, the motor operation mode is dynamically switched from the motor driving mode to the motor power generating mode. The motor operation mode can therefore be switched even more appropriately.

In accordance with a fifth aspect of the present disclosure, the bicycle motor control system of any of the first through fourth aspects is further configured such that the motor communication part is actuated by electrical power generated by the motor. In such a circumstance, since the motor communication part for the motor is actuated by electrical power generated by the motor, processing and control in relation to communication can be performed even in a circumstance in which power is not supplied from an external source.

In accordance with a sixth aspect of the present disclosure, the bicycle motor control system of any of the first through fifth aspects is further provided with a stoppage time calculating part that calculates a time for which communication with the electrical component is stopped. According to the aspect described above, the first mode switching part switches the motor operation mode from the motor driving mode to the motor power generating mode in a circumstance in which communication with the electrical component is disabled for a period that is equal to or greater than a predetermined time. In such a circumstance, the motor operation mode is switched from the motor driving mode to the motor power generating mode in a circumstance in which communication with the electrical component is disabled for the predetermined time or longer. It is thereby possible to restrict the operation mode from switching in a circumstance in which supply of electrical power has stopped temporarily.

In accordance with a seventh aspect of the present disclosure, the bicycle motor control system of any of the first through sixth aspects is further provided with a second mode switching part that switches the motor operation mode from the motor power generating mode to the motor driving mode based on a mode switching signal from the electrical component that is actuated using electrical power that has been charged by a power source that is different from the motor. In such a circumstance, the electrical component mentioned above is actuated using electrical power from the power source that is different from the motor, and the motor operation mode can be dynamically switched from the motor power generating mode to the motor driving mode based on the mode switching signal from the electrical component.

In accordance with an eighth aspect of the present disclosure, the bicycle motor control system of the seventh aspect is further provided with a charge amount monitoring part that monitors an amount of charge in the power source. The second mode switching part switches the motor operation mode from the motor power generating mode to the motor driving mode in a circumstance in which the amount of charge in the power source becomes equal to or greater than a predetermined value. In such a circumstance, since the motor operation mode is switched from the motor power generating mode to the motor driving mode in a circumstance in which the amount of charge in the battery becomes equal to or greater than the predetermined value, rotation of the bicycle wheel can be assisted in a reliable manner after the operation mode has been switched.

In accordance with a ninth aspect of the present disclosure, the bicycle motor control system of the seventh or eighth aspect is further configured such that the second mode switching part switches the motor operation mode from the motor power generating mode to the motor driving mode in a circumstance in which communication is possible, for a predetermined time, between the motor communication part for the motor and a communication part that communicates with the electrical component. In such a circumstance, since the motor operation mode is switched from the motor power generating mode to the motor driving mode in a circumstance in which communication between the motor communication part for the motor and the motor communication part for communicating with the electrical component is maintained over a predetermined time, the motor operation mode can be dynamically switched from the motor power generating mode to the motor driving mode when the state of communication with the electrical component, i.e., the state of supply of electrical power to the motor, is stable.

In accordance with a tenth aspect of the present disclosure, the bicycle motor control system of any of the seventh through ninth aspects is further configured such that the second mode switching part switches the motor operation mode from the motor power generating mode to the motor driving mode based on the state of rotation detected by the rotation detecting part in a circumstance in which a number of rotations of the wheel reaches a predetermined number of rotations or in a circumstance in which the distance over which the bicycle travels reaches a predetermined distance. In such a circumstance, since the motor operation mode is switched from the motor power generating mode to the motor driving mode in a circumstance in which the number of rotations of the wheel reaches a predetermined number of rotations or in a circumstance in which the distance over which the bicycle travels reaches a predetermined distance, the motor operation mode can be switched from the motor power generating mode to the motor driving mode in a state in which the supply of electrical power to the motor is stable. Specifically, electrical power can be supplied to the motor in a reliable manner.

In accordance with an eleventh aspect of the present disclosure, the bicycle motor control system of any of the first through tenth aspects is further configured such that the first mode switching part is part of a motor-integrated hub which includes the motor. Accordingly, the motor operation mode can be dynamically switched, according to a state of communication with the electrical component, from the motor driving mode, in which the motor is capable of assisting rotation of the bicycle wheel, to the motor power generating mode, in which the motor outputs electrical power that has been generated using rotation of the bicycle wheel.

Various objects, features, aspects and advantages of the bicycle motor control system will become apparent to those skilled in the art from the following detailed description, which, taken in conjunction with the annexed drawings, discloses two illustrative embodiments of a bicycle motor control system.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
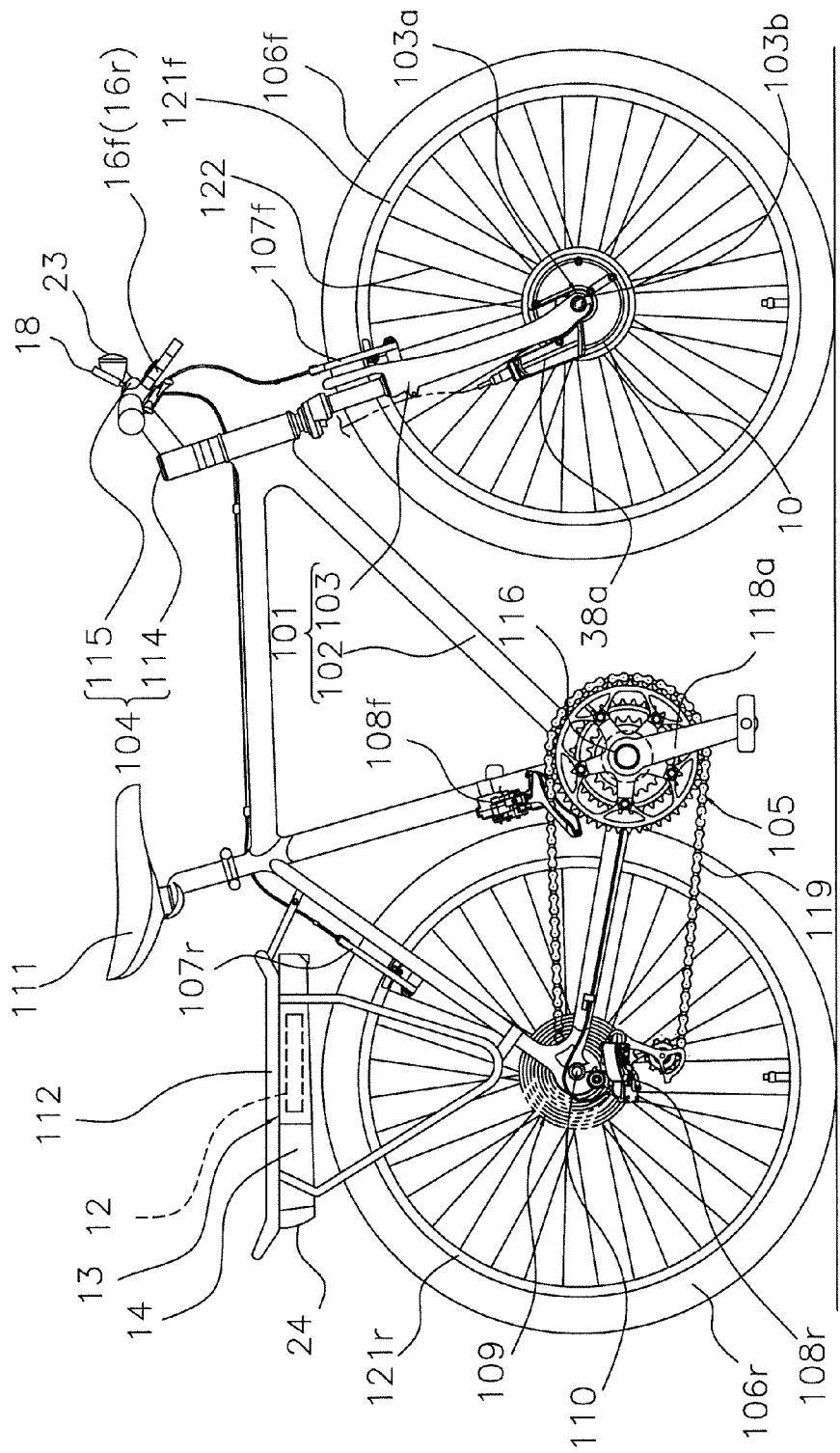
FIG. 1 is a right side elevational view of a bicycle that is equipped with a bicycle motor control system in accordance with the present disclosure.

Referring initially to FIG. 1, a bicycle is illustrated which is equipped with a power-assisted bicycle in which human-powered driving is assisted by a motor-integrated hub or motor unit 10 in accordance with one illustrated embodiment. In the following description, the terms "left" and "right" of the bicycle are defined so that when the bicycle is viewed from the rear, the rightward direction is defined as the right, and the leftward direction is defined as the left.

The bicycle includes a frame 101 having a frame body 102 and a front fork 103 with a handle part 104. The bicycle further includes a drive part 105, a front wheel 106f, a rear wheel 106r, a front braking device 107f, a rear braking device 107r, a headlamp 23 and a tail light 24. The front fork 103 is mounted to a front part of the frame body 102 so as to pivot around an inclined axis. The front brake device 107f performs braking by coming into contact with and applying a braking force to a front rim 121f of the front wheel 106f. The rear brake device 107r performs braking by coming into contact with and applying a braking force to a rear rim 121r of the rear wheel 106r.

A variety of parts including a saddle 111 and the handle part 104 are attached to the frame 101. The drive part 105 includes a front derailleur 108f, a rear derailleur 108r and a gear set 109 mounted on a rear hub 110 of the rear wheel 106r. The drive part 105 also includes a crank shaft 116 supported by a hanger part of the frame body 102 in a rotatable manner. The drive part 105 further includes a gear crank 118a and a left crank (not shown) that are secured to both ends of the crank shaft 116. The drive part 105 has a chain 119 provided around the gear crank 118a and the gear set 109.

In the front derailleur 108f, the chain 119 is engaged around one of e.g., three sprockets mounted on the gear crank 118a. In the rear derailleur 108r, the chain 119 is engaged around one of, e.g., nine sprockets of the gear set 109 attached to the rear hub 110. The front derailleur 108f and the rear derailleur 108r are both electrically driven.

The rear derailleur 108r has an electric shift motor or actuator (not shown), a stage sensor detecting a current shift stage, and a derailleur control portion that controls the electric actuator and the stage sensor. The front derailleur 108f also has an electric shift motor or actuator (not shown), a stage sensor detecting a current shift stage, and a derailleur control portion that controls the electric actuator and the stage sensor. A shift switch that instructs gear shifting is provided on the handlebar 115. The derailleur control portion controls the electric actuator in response to an operation of the shift switch. While the front derailleur 108f and the rear derailleur 108r are to be electrically driven in the present embodiment, the front derailleur 108f and the rear derailleur 108r can alternatively be configured so as to be coupled to shift levers via wires and shift-driven when the wires are pulled by the shift levers.

A rear carrier 112 is attached to an upper rear part of the frame body 102. A rear carrier unit 13 is mounted on the rear carrier 112. The rear carrier unit 13 includes an overall control part 12, which is an electrical component that is capable of changing the operation mode of a main motor body 10a. The overall control part 12 controls other electrical components 20 installed on the bicycle, including the motor-integrated hub 10 (see FIG. 3 for other electrical components 20).

The rear carrier unit 13 is detachably installed with a power-storing part 14, which functions as a power source for the motor-integrated hub 10, the overall control part 12, the headlamp 23, and other electrical components 20. The power-storing part 14 includes a storage battery. The storage battery includes, e.g., a nickel-hydrogen battery, a lithium ion battery, or another battery. The tail light 24 is integrally attached to the power-storing part 14.

The overall control part 12 can be actuated using electrical power charged in the power-storing part 14. The overall control part 12 primarily comprises a CPU (i.e., central processing unit), a ROM (i.e., read-only memory), and a RAM (i.e., random access memory) (not shown). For example, the CPU reads a command relating to control from the ROM and issues the command externally. The CPU also reads a command relating to calculation from the ROM and issues the command externally. In such a circumstance, based on the command from the CPU, a variety of data is read from the ROM and stored in the RAM. The CPU then uses the data stored in the RAM to perform a variety of processes. The CPU then issues a variety of commands externally according to the results of the processes.

The overall control part 12 has an overall communication part 78 (i.e., a communication part for communicating with an electrical component). The overall communication part 78 transmits/receives electrical power signals and information signals via a power line 70 described further below (see FIGS. 2 and 3) using, e.g., PLC (power line communication).

The handle part 104 has a handle stem 114 secured to an upper part of the front fork 103, and a bar-handle-shaped handlebar 115 secured to the handle stem 114. A left brake lever 16f and a right brake lever 16r are mounted on both ends of the handlebar 115. A display unit 18 and the headlamp 23 are mounted on a center part of the handlebar 115. The display unit 18 is capable of displaying the operation mode, such as the assist mode or the regenerative braking mode.

The other electrical components 20 include, e.g., the display unit 18, the headlamp 23, the tail light 24, and other components. The other electrical components 20 are connected to each other by, e.g., PLC through a power line 70. Each of the other electrical components 20 transmits/receives electrical signals and information signals. Also, the electrical components 20 have a function similar to that of the overall control part 12.

Figure 2:
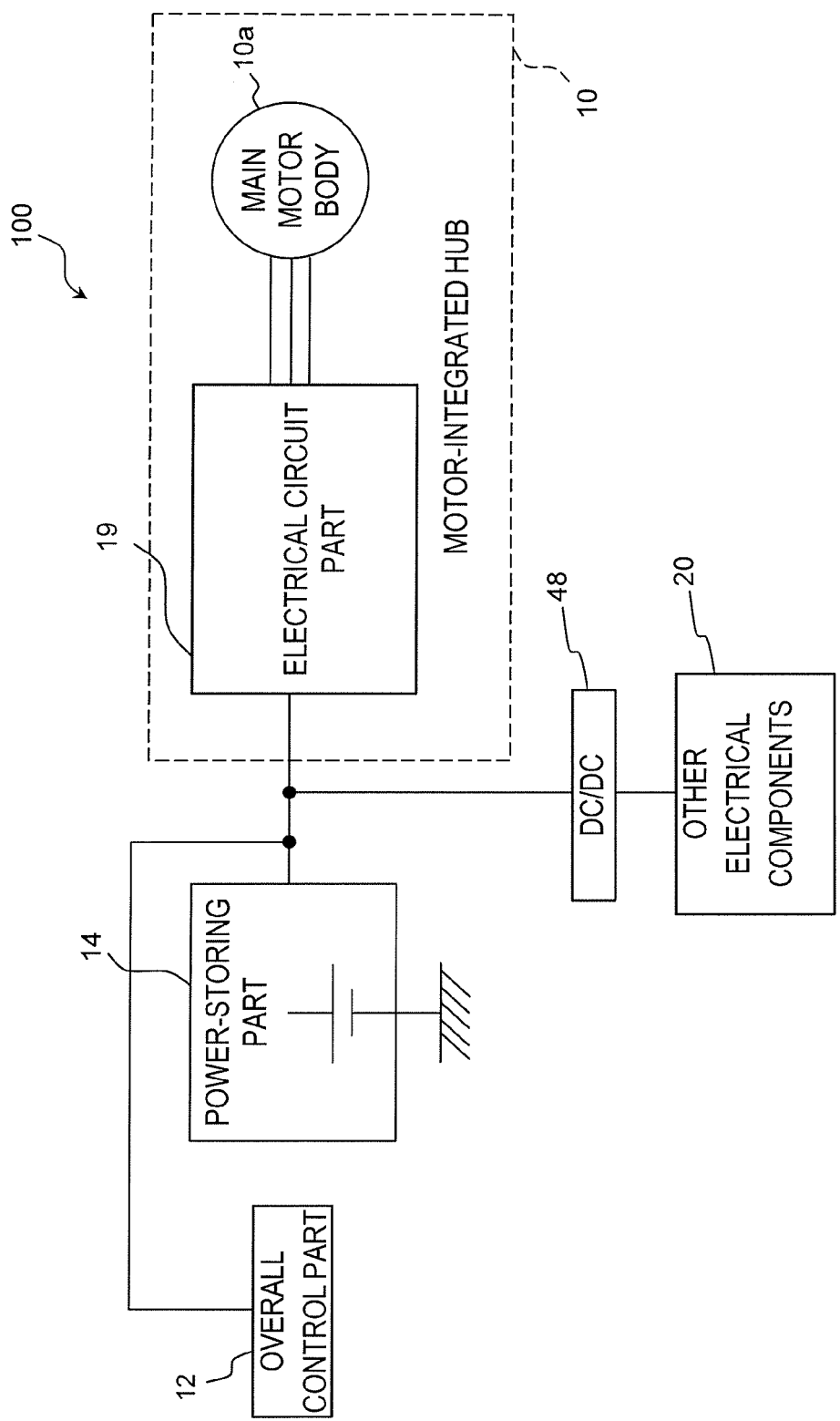
FIG. 2 is a circuit block diagram of an electrical circuit part.

A hub of the front wheel 106f of the bicycle forms the motor-integrated hub 10. The motor-integrated hub 10 is mounted at a distal end of the front fork 103 and is used for assisting human power. The motor-integrated hub 10 includes a motor (hereafter referred to as the main motor body 10a). The main motor body 10a is realized using, e.g., a 3-phase brushless DC motor. As shown in FIG. 2, the motor-integrated hub 10 has a hub axle 15, a motor case 17 mounted on the hub axle 15, and an electrical circuit part 19 arranged within the motor case 17.

The mechanical configuration of the motor-incorporating hub may be an inner rotor motor or an outer rotor motor. The motor-incorporating hub may also comprise a planetary gear mechanism for reducing the rate of rotation from the main motor body 10a and transmitting the rotation to the hub shell. The motor-incorporating hub may also have a configuration in which the planetary gear system is not provided and the rotor is directly connected to the hub shell.

The electrical circuit part 19 performs a drive control of the motor-integrated hub 10, and performs auxiliary control of electrical power supplied to the electrical components 20. The electrical circuit part 19 has the function of a DC-AC inverter for performing switching on a DC current supplied from the power-storing part 14 and converting the DC current into an AC current. The electrical circuit part 19 also has a rotation sensor function for detecting, from the frequency of the switching described above, at least one of the number of rotations and the speed of rotation of the motor-integrated hub 10.

The electrical circuit part 19 also has a regenerative driving function in which a control is performed by the overall control part 12 to vary the regenerative braking ratio when the motor-integrated hub 10 is used to perform regenerative braking. The electrical circuit part 19 also has a power generating mode, in which the main motor body 10a arranged within the motor-integrated hub 10 is used as a generator, and electrical power, which can operate the overall control part 12 and/or the other electrical components 20, is outputted.

The output of the power-storing part 14 varies according to the state of power storage. For example, the power-storing part 14 outputs the maximum voltage when in a fully charged state. The output voltage decreases from the maximum voltage to the minimum voltage as the amount of charge in the power-storing part 14 decreases. For example, as the amount of charge in the power-storing part 14 decreases, the output voltage decreases from 24 V (i.e., maximum voltage) to 18 V (i.e., minimum voltage). When power stored in the power-storing part 14 has been depleted or the amount of power stored falls to a predetermined level or below, output from the power-storing part 14 is stopped. Here, the power-storing part 14 is connected to the overall control part 12, and supply of electrical power from the power-storing part 14 is controlled by the overall control part 12.

The electrical circuit part 19 has a function of a motor driving circuit for driving the main motor body 10a, as well as a function of an electrical power generating circuit for generating electrical power from the main motor body 10a. The electrical circuit part 19 comprises a plurality of (e.g., six) field effect transistors (FETs) installed on a circuit board secured to the interior of a main case body of the motor-integrated hub 10, and other electronic components including a control element 46 for the motor. The electrical circuit part 19 performs auxiliary control of electrical power supplied to the overall control part 12 and/or the other electrical components 20. The electrical circuit part 19 is able to operate under electrical power from the main motor body 10a provided to the bicycle. The electrical circuit part 19 is able to convert electrical power generated by the main motor body 10a to a voltage or a current capable of operating the electrical components 20, and supply the converted electrical power to the overall control part 12 and/or the electrical components 20. The electrical circuit part 19 comprises a control part 71 for the motor, and a communication part 72 for the motor, shown in FIG. 3 and described further below.

Figure 3:
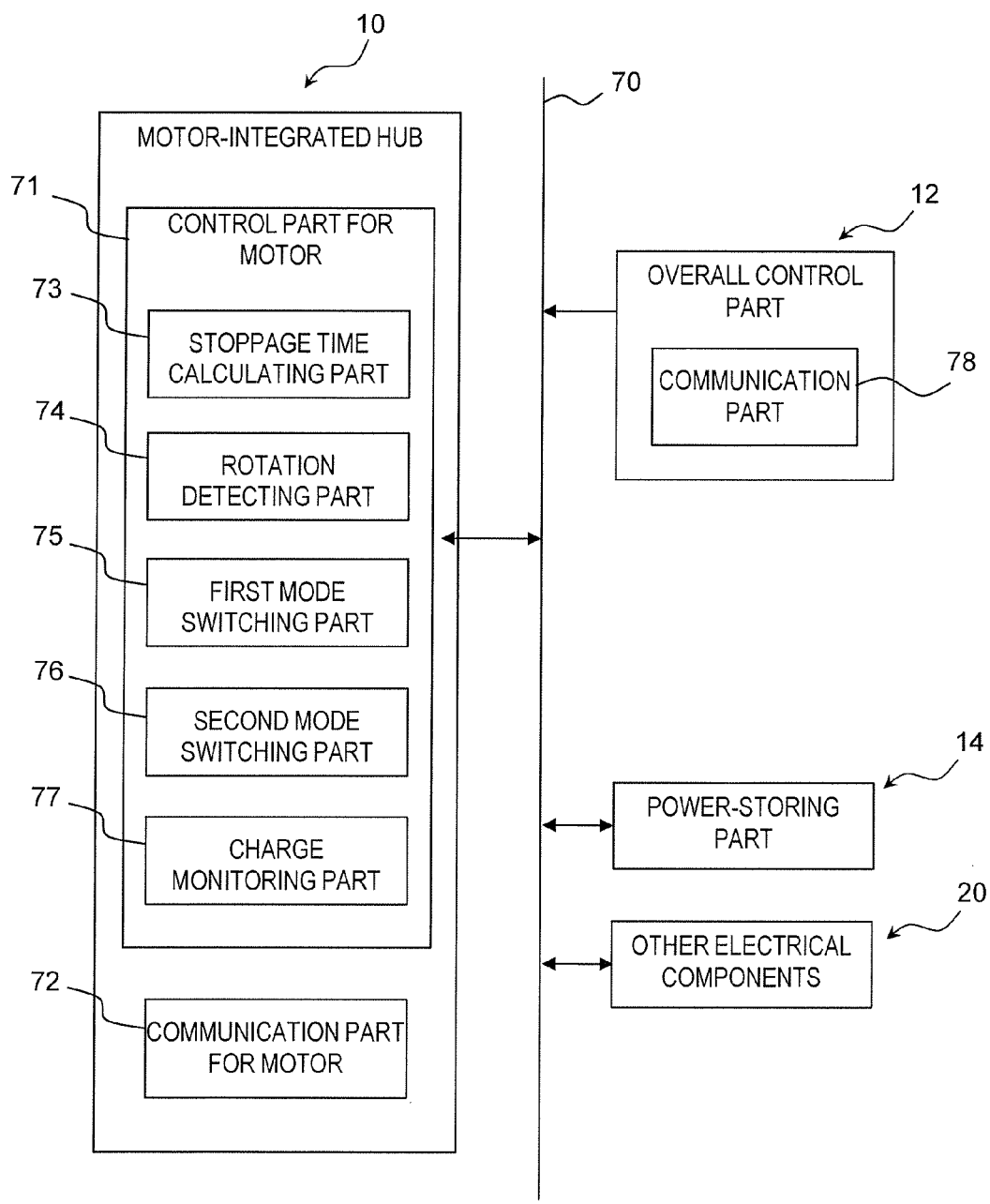
FIG. 3 is a function block diagram of the motor control system.

FIG. 3 shows a function block diagram of the motor control system. The motor control system is used for controlling the motor-integrated hub 10 for assisting the rotation of the bicycle wheel.

The motor-integrated hub 10 comprises the control part 71 for the motor and the motor communication part 72 for the motor.

The control part 71 for the motor determines the state of communication in the motor communication part 72 for the motor, e.g., the state of communication between the motor communication part 72 for the motor and the overall communication part 78. The control part 71 for the motor also determines the state of rotation of the wheel based on information from a rotation detecting part 74. The control part 71 for the motor is configured so as to include the CPU, the ROM, and the RAM. The basic function of these devices is the same as that described for the overall control part 12 described above.

The control part 71 for the motor has the rotation detecting part 74, a first mode switching part 75, a second mode switching part 76, a stoppage time calculating part 73, and a charge monitoring part 77.

The rotation detecting part 74 detects the state of rotation of the wheel. The rotation detecting part 74 detects the state of rotation of the wheel using, e.g., a rotation sensor (not shown) for detecting the number of rotations of the front wheel of the bicycle. The rotation sensor is incorporated in the motor-integrated hub 10. The rotation sensor generates a pulse-shaped voltage every time the front wheel makes a single rotation. The rotation detecting part 74 continually writes the time at which the pulse-shaped voltage is detected onto the RAM. From the time of a pulse detected during a given cycle and the time of a pulse detected during the next cycle, the rotation detecting part 74 calculates the time taken for the front wheel to rotate once and calculates the number of rotations of the front wheel for every minute (i.e., rpm). Also, using the information above, the rotation detecting part 74 can calculate the speed of rotation of the front wheel for every minute. Although a rotation sensor is used here, the rotation detecting part 74 may detect at least one of the number of rotations and the speed of rotation based on the frequency of the current flowing to the main motor body 10a.

The first mode switching part 75 switches the operation mode of the main motor body 10a from the motor driving mode to the motor power generating mode based on a first mode switching signal from the overall control part 12. The first mode switching signal is supplied from the overall control part 12 to the first mode switching part 75 according to at least one state among the state of communication between the motor-integrated hub 10 and the overall control part 12, the state of rotation of the wheel, and the charge state in the power-storing part 14.

The first mode switching part 75 switches the operation mode of the main motor body 10a from the motor driving mode (i.e., assist mode), in which the motor is capable of assisting rotation of the bicycle wheel, to a power generating mode (i.e., dynamo mode), in which the motor outputs electrical power that has been generated using rotation of the bicycle wheel, according to the state of communication with the overall control part 12. In detail, the first mode switching part 75 switches the operation mode of the main motor body 10a according to the state of communication with the overall control part 12 and the state of rotation of the wheel. Specifically, the first mode switching part 75 switches the mode of the main motor body 10a from the motor driving mode to the motor power generating mode in a circumstance in which the speed of rotation of the wheel is greater than a predetermined speed of rotation and communication with the overall control part 12 is disabled for a predetermined time or longer.

The second mode switching part 76 switches the operation mode of the main motor body 10a from the motor power generating mode to the motor driving mode based on a second mode switching signal from the overall control part 12. The second mode switching signal is supplied from the overall control part 12 to the second mode switching part 76 according to the state of communication between the motor-integrated hub 10 and the overall control part 12, the state of rotation of the wheel, and the charge state in the power-storing part 14.

The state of communication between the motor-integrated hub 10 and the overall control part 12 is determined according to whether or not the time of communication is equal to or greater than a predetermined time. For example, in a circumstance in which the time of communication is equal to or greater than the predetermined time, the operation mode of the main motor body 10*a* is switched. The state of rotation of the wheel is detected by the rotation detecting part 74. Here, a description is given for an example of a circumstance in which the mode of the motor-integrated hub 10 is switched based on the number of rotations of the wheel. However, the mode of the motor-integrated hub 10 may be switched based on the distance over which the bicycle travels. In such a circumstance, the travel distance may be calculated in, e.g., the control part 71 for the motor using the result of detection by the rotation detecting part 74 and dimensions of the wheel of the bicycle which have been registered in advance. The charge state in the power-storing part 14 is managed by the charge monitoring part 77.

The charge monitoring part 77 manages the charge state of the power-storing part 14. The charge monitoring part 77 determines whether or not the amount of charge in the power-storing part 14 is equal to or greater than a predetermined value. For example, the operation mode of the main motor body 10*a* is switched in a circumstance in which the first mode switching signal is received in a circumstance in which the amount of charge in the power-storing part 14 is equal to or greater than the predetermined value. The stoppage time calculating part 73 calculates the time for which communication with the electrical components 20 is stopped. Although the charge monitoring part 77 is provided in this circumstance, the charge monitoring part 77 does not have to be provided, and can merely be provided as necessary.

The motor communication part 72 for the motor performs power line communication with the overall communication part 78. The motor communication part 72 for the motor can be actuated by electrical power generated by the motor-integrated hub 10. Supply of electrical power and transmission of signals are performed simultaneously using the power line 70 using, e.g., PLC, as described above.

The overall control part 12 controls, e.g., the electrical components 20, the motor-integrated hub 10, and the power-storing part 14. The overall control part 12 issues the first mode switching signal described above and issues the second mode switching signal described above. The overall control part 12 is activated by electrical power from the motor-integrated hub 10, within which the motor is incorporated, in the motor power generating mode and is actuated by electrical power from the power-storing part 14 in the motor driving mode. The overall control part 12 comprises the overall communication part 78. The overall communication part 78 performs communication with the motor communication part 72 for the motor and other electrical components 20.

Each of the other electrical components 20 has a communication part (not shown). The motor communication part of each of the electrical components 20 performs communication with the overall communication part 78. The motor communication part of each of the electrical components 20 performs communication between the electrical components 20. Communication in this circumstance is power line communication. Supply of electrical power and transmission of signals are performed simultaneously using the power line 70 using, e.g., PLC, as described above.

Figure 4:
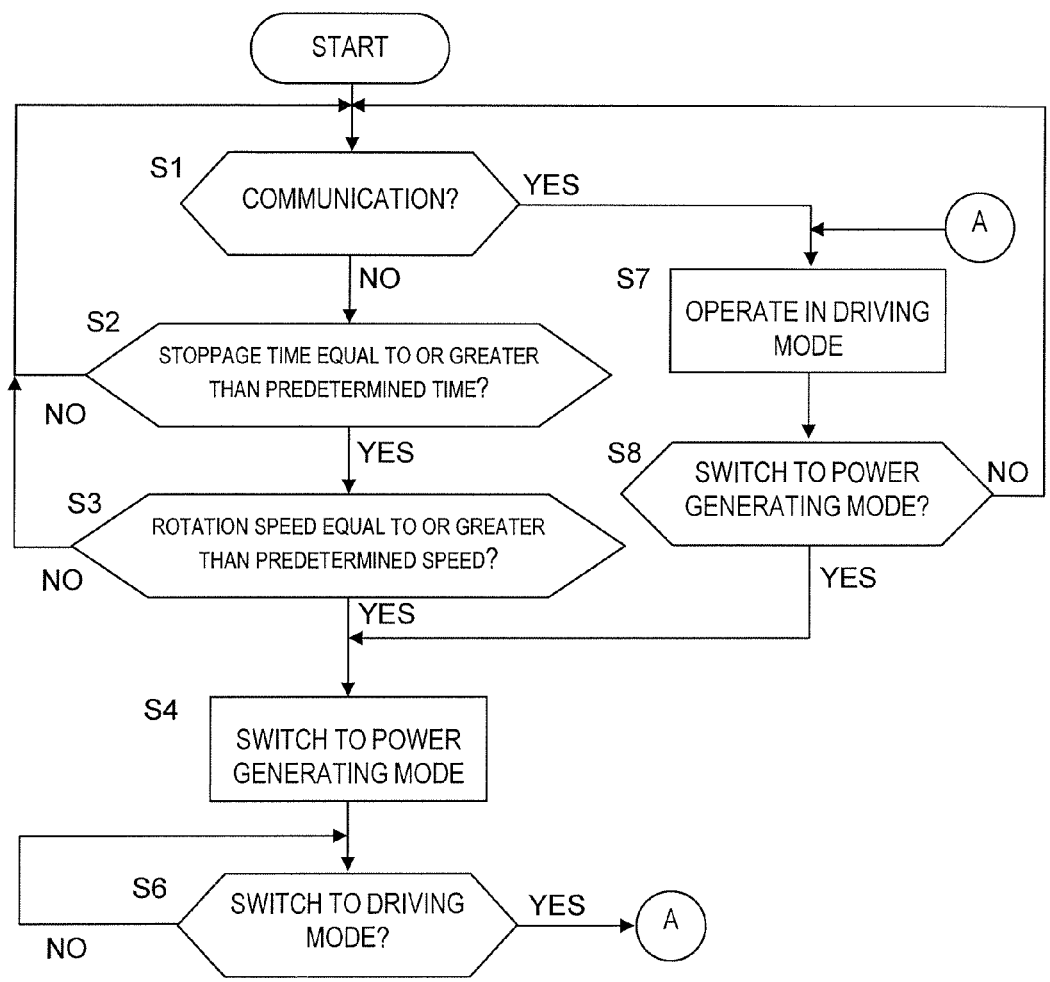
FIG. 4 is a flow chart showing the control process executed by the motor control system in accordance with a first embodiment.

FIG. 4 illustrates a flow chart of a control process executed by the motor control system described above. The motor control system is a system for controlling the motor-integrated hub 10. The motor control system has a function of switching the operation mode of the main motor body 10*a* from the motor driving mode to the motor power generating mode and a function of switching the operation mode of the main motor body 10*a* from the motor power generating mode to the motor driving mode.

An example of operation of the motor control system will now be described. When electrical power is supplied from the control part 71 for the motor, the main flow is initiated. First, the control part 71 for the motor determines whether or not communication is being performed from the overall control part 12 to the motor-integrated hub 10 (step S1). For example, the control part 71 for the motor determines whether or not transmission/reception of a signal is being performed between the motor communication part 72 for the motor and the overall communication part 78. In a circumstance in which transmission/reception of a signal has stopped between the motor communication part 72 for the motor and the overall communication part 78 (i.e., "No" in step S1), the control part 71 for the motor determines whether or not the time for which the signal is stopped is equal to or greater than a predetermined time (step S2).

Next, in a circumstance in which the time for which the signal is stopped is equal to or greater than the predetermined time (i.e., "Yes" in step S2), the control part 71 for the motor determines whether or not the speed of rotation of the wheel, e.g., the speed of rotation of the front wheel, is greater than a predetermined speed of rotation (step S3). In a circumstance in which the speed of rotation of the front wheel is greater than the predetermined speed of rotation (i.e., "Yes" in step S3), the control part 71 for the motor switches the operation mode of the main motor body 10*a* from the motor driving mode to the motor power generating mode (step S4).

Next, the control part 71 for the motor determines whether or not to switch the operation mode of the main motor body 10*a* from the motor power generating mode to the motor driving mode (step S6). For example, in a circumstance in which the second mode switching signal is issued by the overall control part 12 and the second mode switching signal is received by the motor communication part 72 for the motor, the control part 71 for the motor switches the operation mode of the main motor body 10*a* from the motor power generating mode to the motor driving mode, based on the second mode switching signal (i.e., "Yes" in step S6). In a state in which the second mode switching signal is not being inputted into the motor communication part 72 for the motor, the control part 71 for the motor monitors the input of the second mode switching signal (i.e., "No" in step S6).

Meanwhile, in a circumstance in which transmission/reception of a signal is being performed between the motor communication part 72 for the motor and the overall communication part 78 (i.e., "Yes" in step S1), the control part 71 for the motor operates the main motor body 10*a* in the motor driving mode (step S7). Next, the control part 71 for the motor determines whether or not to switch the operation mode of the main motor body 10*a* from the motor driving mode to the motor power generating mode (step S8). For example, in a circumstance in which the first mode switching signal is issued by the overall control part 12 and the first mode switching signal is received by the motor communication part 72 for the motor, the control part 71 for the motor switches the operation mode of the main motor body 10*a* from the motor driving mode to the motor power generating mode, based on the first mode switching signal (i.e., "Yes" in step S8). In a state in which the motor-integrated hub 10 is operating in the motor driving mode, (i.e., step S7, and "No" in step S8), the control in step S1 is performed.

Although the end is not displayed in the above control process, the above control process ends when supply of electrical power to the control part 71 for the motor is stopped. For example, when electrical power is not supplied from the power line 70 to the control part 71 for the motor and rotation of the wheel stops, the above control process ends.

As described above, in the present embodiment, the control part 71 for the motor dynamically switches the operation mode of the main motor body 10*a* from the motor driving mode to the motor power generating mode according to the state of communication between the motor-integrated hub 10 and the electrical components 20 and the state of rotation of the wheel, thereby making it possible to set the operation mode of the main motor body 10*a* to the appropriate mode.

According to the present embodiment, moreover, the control part 71 for the motor can dynamically switch the operation mode of the main motor body 10*a* from the motor power generating mode to the motor driving mode in a circumstance in which power generating mode has been enabled as the operation mode, and dynamically switch the operation mode of the main motor body 10*a* from the motor driving mode to the motor power generating mode in a circumstance in which driving mode has been enabled as the operation mode. It is thereby possible to set the operation mode of the main motor body 10*a* to the appropriate mode.

Figure 5:
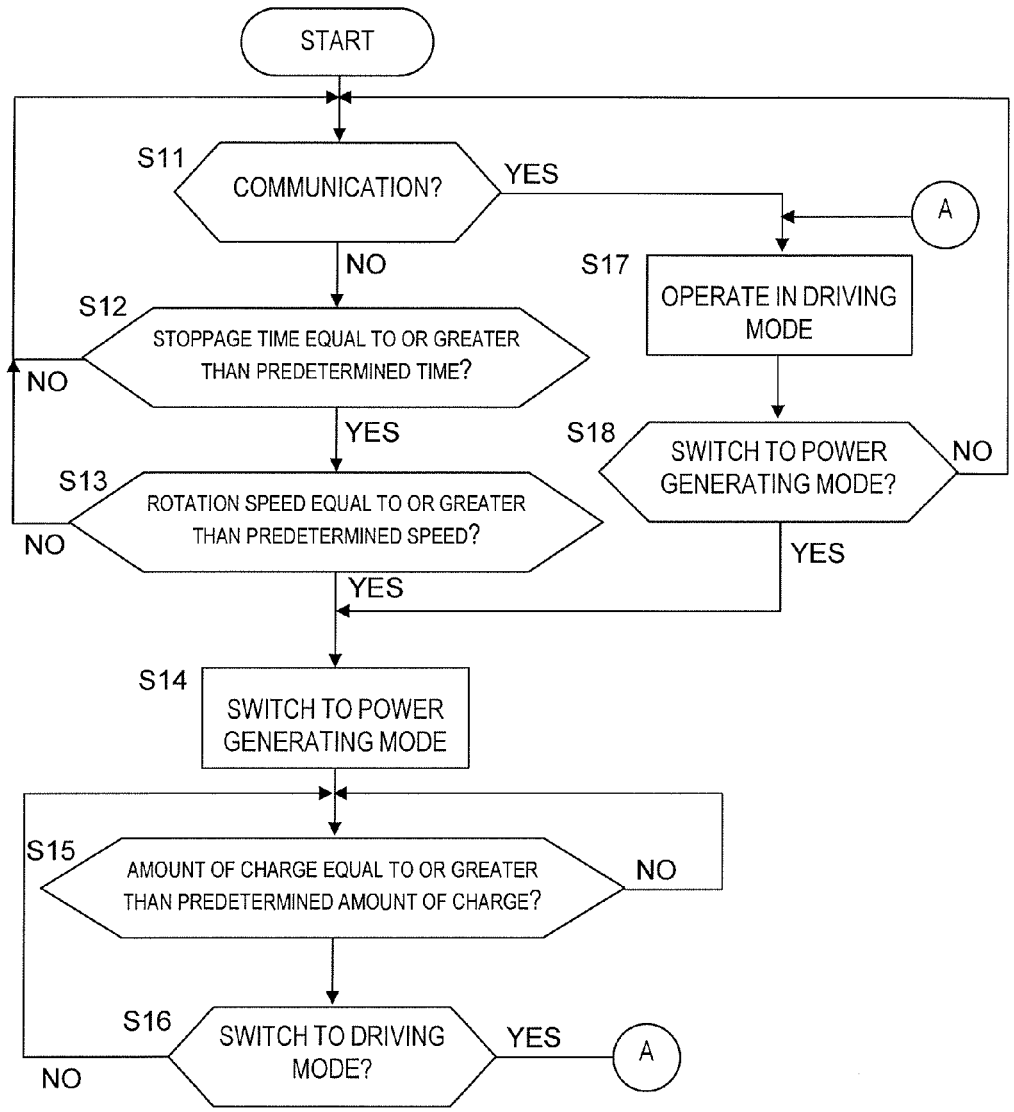
FIG. 5 is a flow chart showing the control process executed by the motor control system in accordance with a second embodiment.

FIG. 5 illustrates a flow chart of a control process executed by the motor control system according to a second embodiment. The motor control system according to the second embodiment is a system for controlling the motor-integrated hub 10. The basic configuration is similar to that of the motor control system according to the first embodiment; only the control process differs. The control process executed by the motor control system shown in FIG. 5 (steps S11 to S18) is the same as the control process executed by the motor control system shown in FIG. 4 with the exception of the section for step S15 described further below. In other words, each of the steps S11 to S14 and steps S16 to S18 shown in FIG. 5 corresponds with each of the steps S1 to S4 and steps S6 to S8 shown in FIG. 4. Therefore, a description of sections in which the processing procedure is identical to that in the control process executed by the motor control system according to the first embodiment shown in FIG. 4 shall not be provided.

In the motor control system according to the second embodiment, when the control part 71 for the motor switches the operation mode of the main motor body 10*a* to the motor power generating mode at step S14, the control part 71 for the motor monitors whether or not the amount of charge in the power-storing part 14 is equal to or greater than the predetermined value (step S15). In a circumstance in which the amount of charge in the power-storing part 14 is equal to or greater than the predetermined value ("Yes" in step S15), the control in step S16 is performed.

As described above, in the present embodiment, the operation mode of the main motor body 10*a* is dynamically switched in the motor-integrated hub 10 from the motor power generating mode to the motor driving mode according to the charge state in the power-storing part 14, thereby making it possible to set the operation mode of the main motor body 10*a* in an appropriate manner. Also, sections of the control that are identical to those in the previous embodiment make it possible for a similar effect to be obtained.

Figure 6:
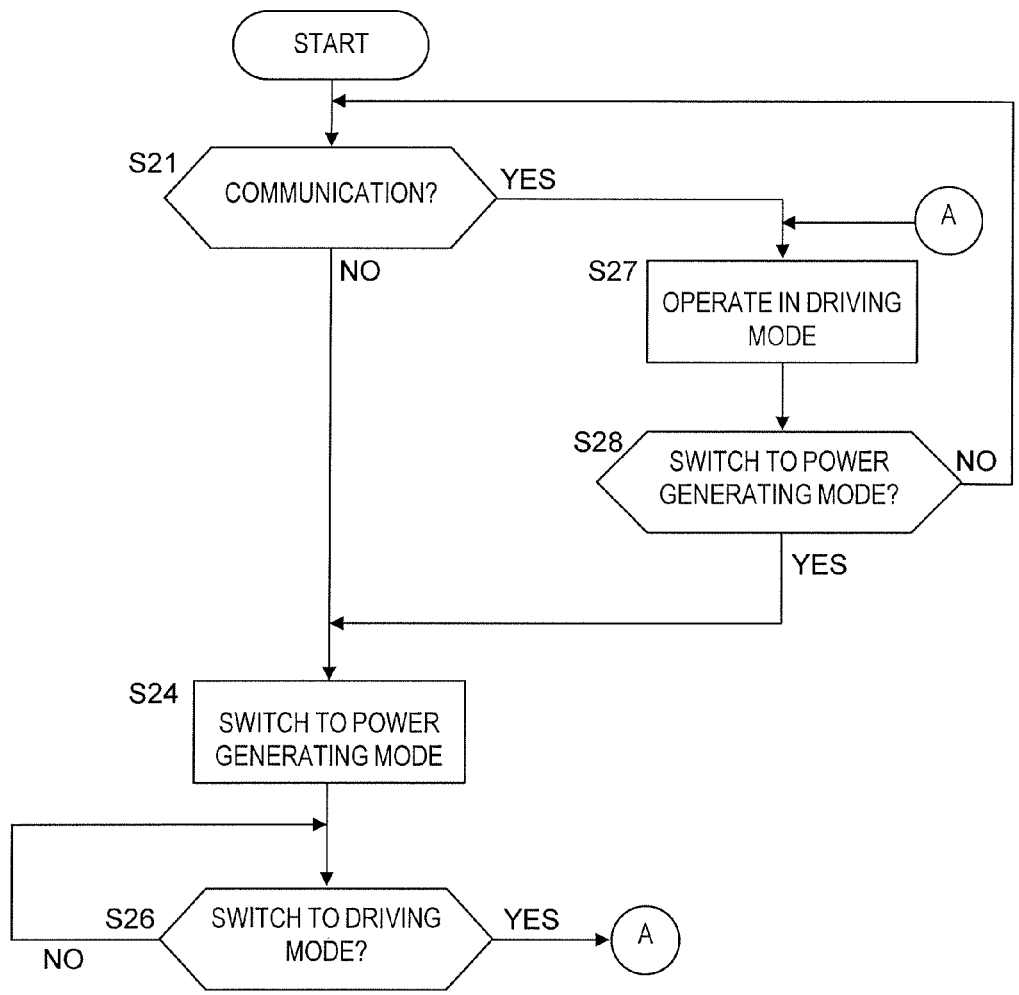
FIG. 6 is a flow chart showing the control process executed by the motor control system in accordance with a third embodiment.

FIG. 6 illustrates a flow chart of a control process executed by the motor control system according to a third embodiment. The motor control system according to the third embodiment is a system for controlling the motor-integrated hub 10. The basic configuration is similar to that of the motor control system according to the first embodiment; only the control process differs. The control process executed by the motor control system according to the third embodiment shown in FIG. 6 (steps S21 to S28) is the same as the control process executed by the motor control system according to the first embodiment shown in FIG. 4 with the exception of sections for steps S2 and S3 of the control process executed by the motor control system according to the first embodiment shown in FIG. 4. In other words, each of the steps S21, S24 and steps S26 to S28 shown in FIG. 6 corresponds with each of the steps S1, S4 and steps S6 to S8 shown in FIG. 4. Therefore, a description of sections in which the processing procedure is identical to that in the control process executed by the motor control system according to the first embodiment shown in FIG. 4 shall not be provided.

In the control process executed by the motor control system according to the third embodiment, as shown in FIG. 6, in a circumstance in which it is determined in step S21 that transmission/reception of signals is not being performed between the motor communication part 72 for the motor and the overall communication part 78, e.g., in a circumstance in which transmission/reception of signals has stopped between the motor communication part 72 for the motor and the overall communication part 78 (i.e., "No" in step S21), the control part 71 for the motor switches the operation mode of the main motor body 10*a* from the motor driving mode to the motor power generating mode (step S24).

As described above, in the present embodiment, the control part 71 for the motor dynamically switches the operation mode of the main motor body 10*a* from the motor driving mode to the motor power generating mode according to the state of communication between the motor-integrated hub 10 and the electrical component 20, thereby making it possible to set the operation mode of the main motor body 10*a* in an appropriate manner. Also, sections of the control that are identical to those in the previous embodiment make it possible for a similar effect to be obtained.

Figure 7:
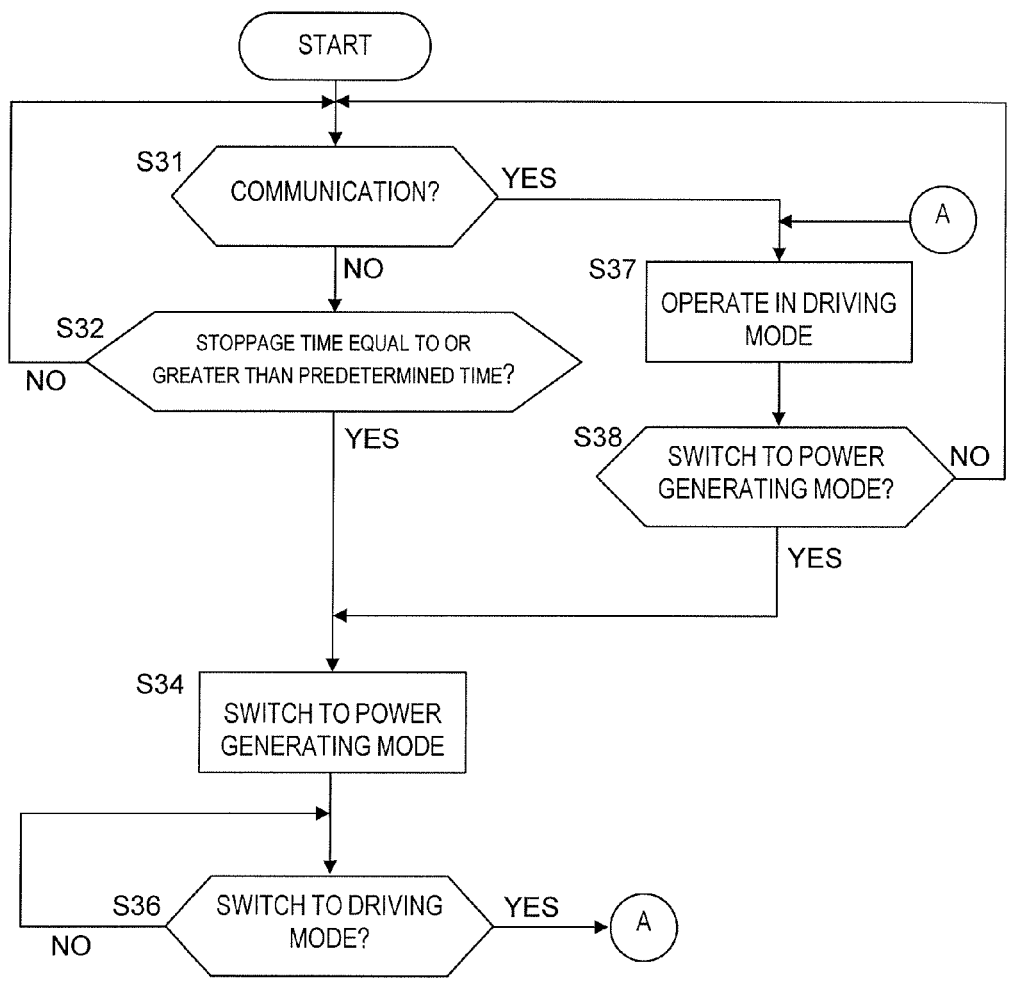
FIG. 7 is a flow chart showing the control process executed by the motor control system in accordance with a fourth embodiment.

FIG. 7 illustrates a flow chart of a control process executed by the motor control system according to a fourth embodiment. The motor control system according to the fourth embodiment is a system for controlling the motor-integrated hub 10. The basic configuration is similar to that of the motor control system according to the first embodiment; only the control process differs. The control process executed by the motor control system shown in FIG. 7 (steps S31 to S38) is the same as the control process executed by the motor control system according to the first embodiment shown in FIG. 4 with the exception of the section for step S3 of the control process executed by the motor control system according to the first embodiment shown in FIG. 4. In other words, each of the steps S31, S32, S34 and S36 to S38 shown in FIG. 7 corresponds with each of the steps S1, S2, S4 and S6 to S8 shown in FIG. 4. Therefore, a description of sections in which the processing procedure is identical to that in the control process executed by the motor control system according to the first embodiment shown in FIG. 4 shall not be provided.

In the control process executed by the motor control system according to the fourth embodiment, as shown in FIG. 7, the control part 71 for the motor determines, in step S32, whether or not the time for which signal transmission/reception between the motor communication part 72 for the motor and the overall communication part 78 has stopped (i.e., stoppage time) is equal to or greater than a predetermined time. In a circumstance in which the signal stoppage time is equal to or greater than the predetermined time (i.e., "Yes" in step S32), the control part 71 for the motor switches the operation mode of the main motor body 10*a* from the motor driving mode to the motor power generating mode based on a first mode switching signal (step S34).

As described above, in the present embodiment, the control part 71 for the motor dynamically switches the operation mode of the main motor body 10a from the motor driving mode to the motor power generating mode according to the time for which communication between the motor-integrated hub 10 and the electrical component 20 has stopped, thereby making it possible to set the operation mode of the main motor body 10a in an appropriate manner. Also, sections of the control that are identical to those in the previous embodiment make it possible for a similar effect to be obtained.

Figure 8:
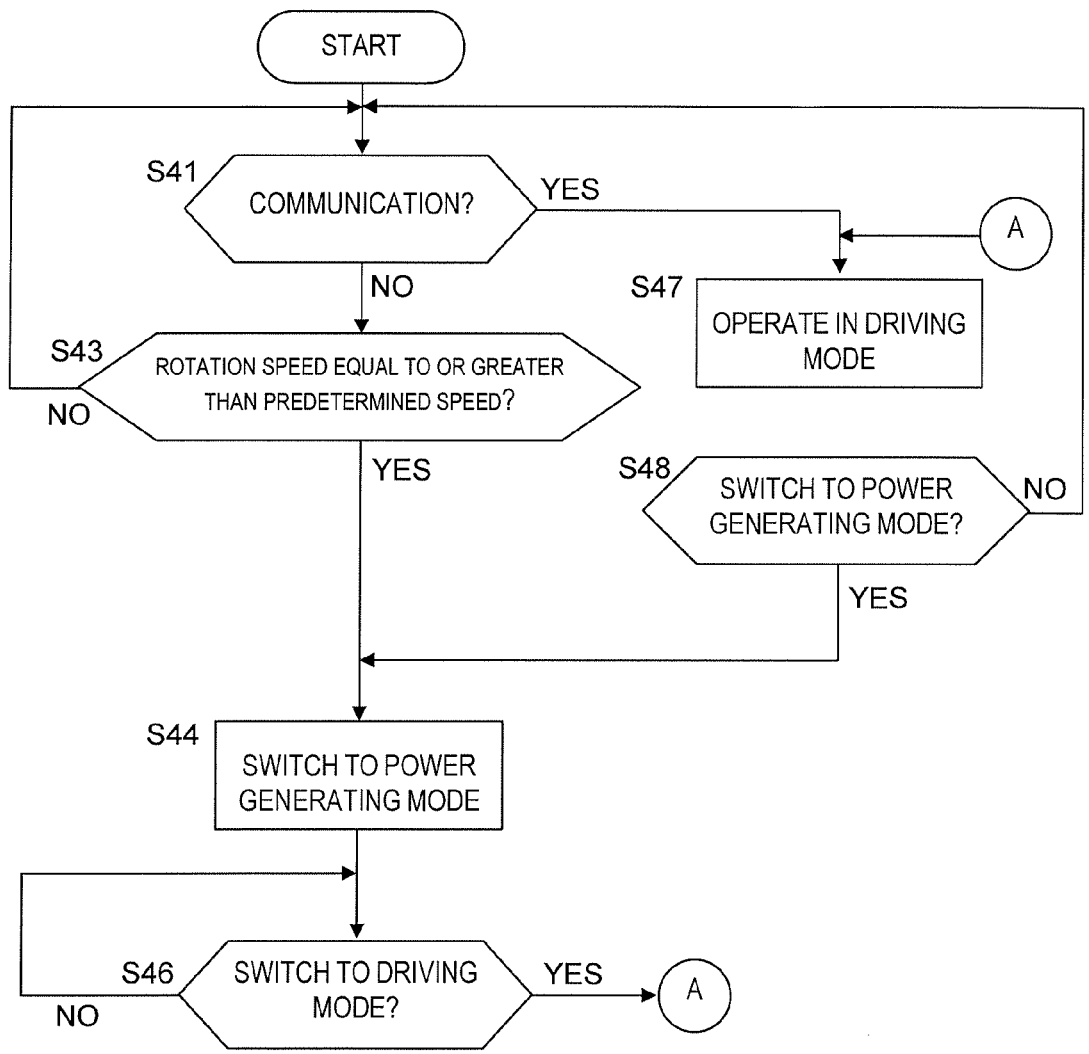
FIG. 8 is a flow chart showing the control process executed by the motor control system in accordance with a fifth embodiment.

FIG. 8 illustrates a flow chart of a control process executed by the motor control system according to a fifth embodiment. The motor control system according to the fifth embodiment is a system for controlling the motor-integrated hub 10. The basic configuration is similar to that of the motor control system according to the first embodiment; only the control process differs. The control process executed by the motor control system according to the fifth embodiment shown in FIG. 8 (step S41 to S48) is the same as the control process executed by the motor control system according to the first embodiment shown in FIG. 4 with the exception of the section for step S2 of the control process executed by the motor control system according to the first embodiment shown in FIG. 4. In other words, each of the steps S41, S43, S44 and S46 to S48 shown in FIG. 8 corresponds with each of the steps S1, S3, S4 and S6 to S8 shown in FIG. 4. Therefore, a description of sections in which the processing procedure is identical to that in the control process executed by the motor control system shown in FIG. 4 shall not be provided.

In the motor control system according to the fifth embodiment, as shown in FIG. 8, the control part 71 for the motor determines, in step S43, whether or not the speed of rotation of the wheel, e.g., the speed of rotation of the front wheel, is greater than a predetermined speed of rotation. In a circumstance in which the speed of rotation of the front wheel is greater than the predetermined speed of rotation (i.e., "Yes" in step S43), the control part 71 for the motor switches the operation mode of the main motor body 10a from the motor driving mode to the motor power generating mode (step S44).

As described above, in the present embodiment, the control part 71 for the motor dynamically switches the operation mode of the main motor body 10a from the motor driving mode to the motor power generating mode according to the speed of rotation of the wheel, thereby making it possible to set the operation mode of the main motor body 10a in an appropriate manner. Also, sections of the control that are identical to those in the previous embodiment make it possible for a similar effect to be obtained.

Figure 9:
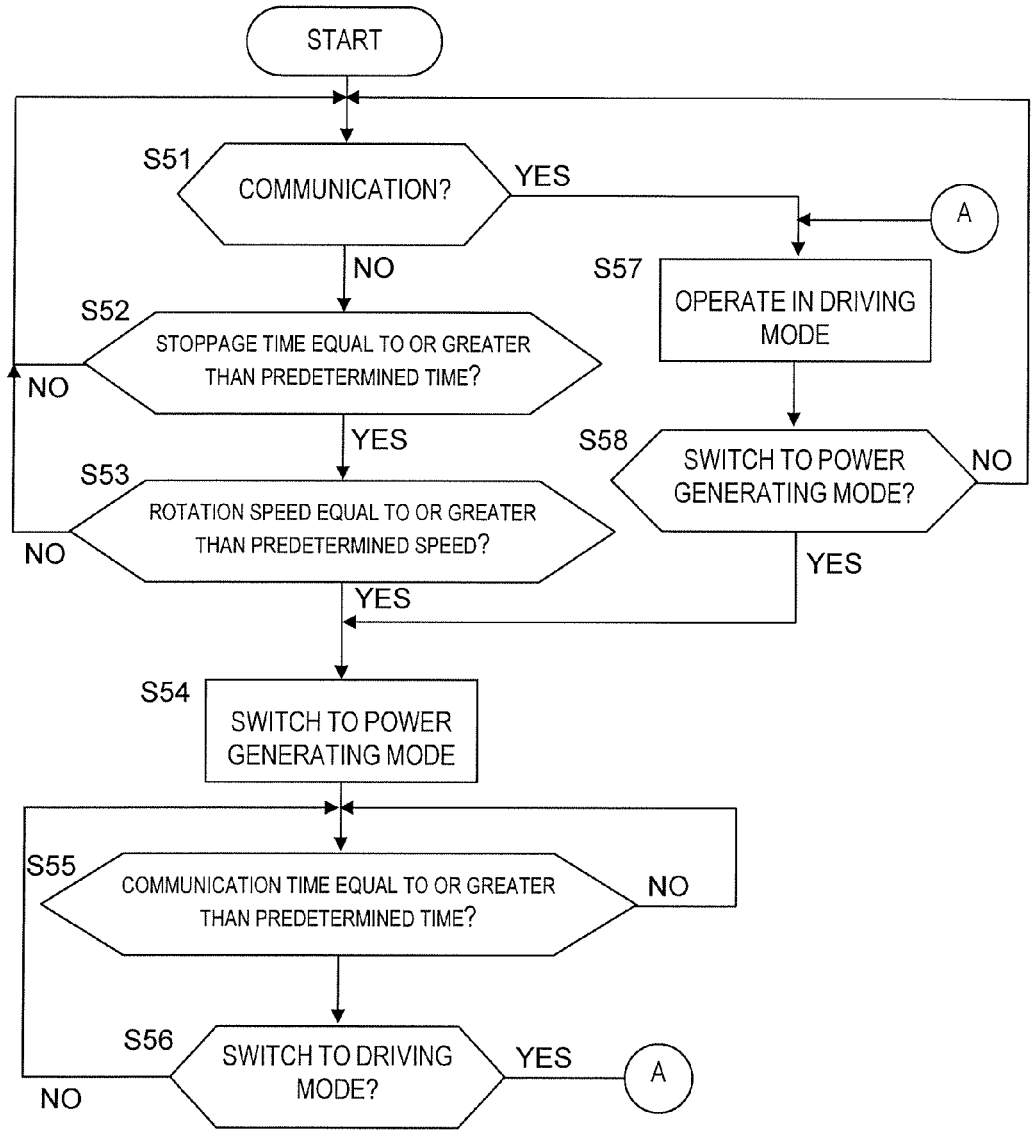
FIG. 9 is a flow chart showing the control process executed by the motor control system in accordance with a sixth embodiment.

FIG. 9 illustrates a flow chart of a control process executed by the motor control system according to a sixth embodiment. The motor control system according to the sixth embodiment is a system for controlling the motor-integrated hub 10. The basic configuration is similar to that of the motor control system according to the first embodiment; only the control process differs. The control process executed by the motor control system shown in FIG. 9 (steps S51 to S58) is the same as the control process executed by the motor control system according to the first embodiment shown in FIG. 4 with the exception of the section for step 55. In other words, each of the steps S51 to S54 and steps S56 to S58 shown in FIG. 9 corresponds with each of the steps S1 to 4 and steps S6 to S8 shown in FIG. 4. Therefore, a description of sections in which the processing procedure is identical to that in the control process executed by the motor control system according to the first embodiment shown in FIG. 4 shall not be provided.

In the control process executed by the motor control system according to the sixth embodiment, as shown in FIG. 9, when the operation mode of the main motor body 10a is switched to the motor power generating mode in step S54, the control part 71 for the motor calculates the time of communication with the overall communication part 78, and the control part 71 for the motor determines whether or not the time of communication is equal to or greater than a predetermined time (step S55). In a circumstance in which the time of communication has become equal to or greater than the predetermined time (i.e., "Yes" in step S55), the control in step S56 is performed. Meanwhile, in a circumstance in which the time of communication is less than the predetermined time (i.e., "No" in step S55), the time of communication is monitored by the control part 71 for the motor until the time of communication becomes equal to or greater than the predetermined time (i.e., "No" in step S55).

As described above, in the present embodiment, the control part 71 for the motor dynamically switches the operation mode of the main motor body 10a from the motor driving mode to the motor power generating mode according to the state of communication between the motor-integrated hub 10 and the overall control part 12 and the state of rotation of the wheel, thereby making it possible to set the operation mode of the main motor body 10a in an appropriate manner.

Also, in the present embodiment, it is possible to dynamically switch the operation mode of the main motor body 10a from the motor power generating mode to the motor driving mode according to the state of communication between the motor-integrated hub 10 and the overall control part 12, thereby making it possible to set the operation mode of the main motor body 10a in an appropriate manner. Also, sections of the control that are identical to those in the previous embodiment make it possible for a similar effect to be obtained.

Figure 10:
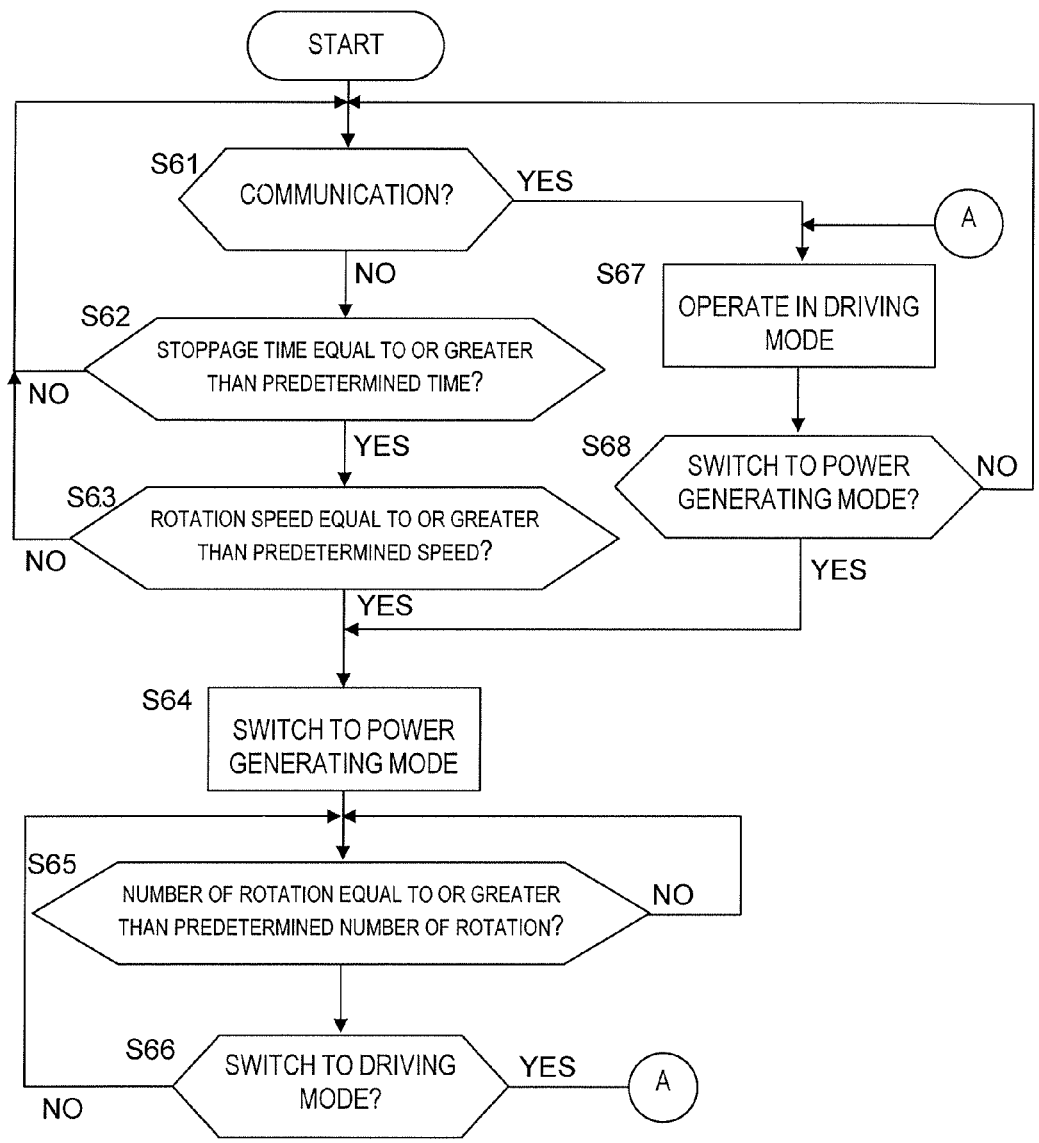
FIG. 10 is a flow chart showing the control process executed by the motor control system in accordance with a seventh embodiment.

FIG. 10 illustrates a flow chart of a control process executed by the motor control system according to a seventh embodiment. The motor control system according to the seventh embodiment is a system for controlling the motor-integrated hub 10. The basic configuration is similar to that of the motor control system according to the first embodiment; only the control process differs. The control process executed by the motor control system according to the seventh embodiment shown in FIG. 10 (steps S61 through S68) is the same as the control process executed by the motor control system according to the first embodiment shown in FIG. 4 with the exception of the section for step S65. In other words, each of the steps S11 to S14 and steps S16 to S18 shown in FIG. 5 corresponds with each of the steps S1 to S4 and steps S6 to S8 shown in FIG. 4. Therefore, a description of sections in which the processing procedure is identical to that in the control process executed by the motor control system according to the first embodiment shown in FIG. 4 shall not be provided.

In the control process executed by the motor control system according to the seventh embodiment, as shown in FIG. 10, when the operation mode of the main motor body 10a is switched to the motor power generating mode in step S64, the control part 71 for the motor determines whether or not the number of rotations of the wheel, e.g., the number of rotations of the front wheel, has become equal to or greater than a predetermined number (step S65). In a circumstance in which the number of rotations of the front wheel becomes equal to or greater than the predetermined number of rotations (i.e., "Yes" in step S65), the control in step S66 is performed. Meanwhile, in a circumstance in which the number of rotations of the front wheel is less than the predetermined number of rotations (i.e., "No" in step S65), the number of rotations is monitored by the control part 71 for the motor until the number of rotations becomes equal to or greater than the predetermined number of rotations.

As described above, in the present embodiment, the operation mode of the main motor body 10a is dynamically switched from the motor driving mode to the motor power generating mode according to the state of communication between the motor-integrated hub 10 and the electrical components 20 and the state of rotation of the wheel, thereby making it possible to set the operation mode of the main motor body 10a in an appropriate manner.

Also, in the present embodiment, the control part 71 for the motor dynamically switches the operation mode of the main motor body 10a from the motor driving mode to the motor power generating mode according to the state of rotation of the wheel, thereby making it possible to set the operation mode of the main motor body 10a in an appropriate manner. Also, sections of the control that are identical to those in the previous embodiment make it possible for a similar effect to be obtained.

Although several embodiment of the present invention has been described above, the present invention is not limited in scope thereby; a variety of modifications being possible without departing from the scope of the invention.

(a) Although in the above embodiments, the headlamp 23 and other electrical components are shown as examples of the other electrical components 20, the electrical components 20 are not limited to those shown above. The electrical components 20 include all electrical components 20 that can be installed on a bicycle.

(b) Another embodiment may be configured in a similar manner to the second embodiment, wherein step 16 is omitted, and in a circumstance in which the decision at step S15 is "Yes", the control process proceeds to step S17.

(c) Another embodiment may be configured in a similar manner to the sixth embodiment, wherein step S56 is omitted, and in a circumstance in which the decision at step S55 is "Yes", the control process proceeds to step S57.

(d) Another embodiment may be configured in a similar manner to the seventh embodiment, wherein step 66 is omitted, and in a circumstance in which the decision at step S65 is "Yes", the control process proceeds to step S67.

(e) Although in the above embodiments, the power-assisted bicycle is configured so as to have an external shifting device, the power-assisted bicycle may also be configured so as to have an internal shifting device, or to have no shifting device. The present system can be applied to all types of power-assisted bicycles.

(g) Although in the present embodiment, the motor-incorporating hub is provided to the front of the power-assisted bicycle, the present system can be applied to a configuration in which the motor-incorporating hub is provided to the rear, or to a configuration in which a motor is provided to the vicinity of a pedal crank to apply a driving force to the chain or to drive the pedal crank.

Thus, the foregoing descriptions of the embodiments according of bicycle regenerative brake control device are provided for illustration only, and not for the purpose of limiting the invention as defined by the appended claims and their equivalents.

What is claimed is:

1. A bicycle motor control system for controlling a motor for assisting rotation of a bicycle wheel, the bicycle motor control system comprising:
a motor communication part that performs power line communication with an electrical bicycle component through a common power line used to communicate both electrical power and information; and
a motor control part configured to set a motor operation mode of the motor to a motor driving mode or a motor power generating mode in response to a mode switching signal from the electrical bicycle component, the motor driving mode being a mode in which the motor assists in rotating the bicycle wheel and the motor power generating mode being a mode in which the motor outputs electrical power that has been generated using rotation of the bicycle wheel,
the motor control part being operated by at least one of electrical power supplied via the common power line and electrical power generated by the motor,
the motor control part being configured to determine if a signal is being communicated between the electrical bicycle component and the motor communication part,
the motor control part including a first mode switching part that switches the motor operation mode from the motor driving mode to the motor power generating mode upon a determination that a signal is not being communicated between the motor communication part and the electrical bicycle component.

2. The bicycle motor control system according to claim 1, further comprising
a rotation detecting part that detects a state of rotation of the bicycle wheel, and
the first mode switching part switching the motor operation mode from the motor driving mode to the motor power generating mode upon a determination signal is not being communicated between the motor communication part and the electrical bicycle component and that the state of rotation of the bicycle wheel is a predetermined state.

3. The bicycle motor control system to claim 2, wherein
the predetermined state is that the speed of rotation of the wheel is greater than a predetermined speed of rotation.

4. The bicycle motor control system according to claim 2, wherein
the motor communication part is actuated by electrical power generated by the motor.

5. The bicycle motor control system according to claim 2, further comprising
a stoppage time calculating part that calculates a time for which communication of a signal between the motor communication part and the electrical bicycle component has not occurred, and
the first mode switching part switching the motor operation mode from the motor driving mode to the motor power generating mode upon a determination that a signal has not been communicated between the motor communication part and the electrical bicycle component for a predetermined amount of time or longer, and that the state of rotation of the bicycle wheel is a predetermined state.

6. The bicycle motor control system according to claim 2, further comprising
a second mode switching part that switches the motor operation mode from the motor power generating mode to the motor driving mode based on the mode switching signal from the electrical bicycle component, the electrical bicycle component being actuated using electrical power that has been charged by a power source that is different from the motor.

7. The bicycle motor control system according to claim 6, further comprising
a charge amount monitoring part that monitors an amount of charge in the power source; and
the second mode switching part switching the motor operation mode from the motor power generating mode to the motor driving mode upon the amount of charge in the power source becoming equal to or greater than a predetermined value.

8. The bicycle motor control system according to claim 6, wherein
the second mode switching part switches the motor operation mode from the motor power generating mode to the motor driving mode upon determination that communication has been possible for a predetermined time between the motor communication part for the motor and a communication part that communicates with the electrical bicycle component.

9. The bicycle motor control system according to claim 6, further comprising
a rotation detecting part that detects a state of rotation of the bicycle wheel,
the second mode switching part switching the motor operation mode from the motor power generating mode to the motor driving mode based on the state of rotation detected by the rotation detecting part upon a rotational speed of the wheel reaching a predetermined rotational speed or upon the distance over which the bicycle has traveled reaching a predetermined distance.

10. The bicycle motor control system according to claim 1, wherein
the motor communication part is actuated by electrical power generated by the motor.

11. The bicycle motor control system according to claim 1, further comprising
a second mode switching part that switches the motor operation mode from the motor power generating mode to the motor driving mode based on the mode switching signal from the electrical bicycle component, the electrical bicycle component being actuated using electrical power that has been charged by a power source that is different from the motor.

12. The bicycle motor control system according to claim 11, further comprising
a charge amount monitoring part that monitors an amount of charge in the power source; and
the second mode switching part switching the motor operation mode from the motor power generating mode to the motor driving mode upon the amount of charge in the power source becoming equal to or greater than a predetermined value.

13. The bicycle motor control system according to claim 1, wherein
the first mode switching part is part of a motor-integrated hub which includes the motor.

14. A bicycle motor control system for controlling a motor for assisting rotation of a bicycle wheel, the bicycle motor control system comprising:
a motor communication part that performs power line communication with an electrical bicycle component through a common power line used to communicate both electrical power and information, the electrical bicycle component being configured to change a motor operation mode of the motor; and
a first mode switching part operated either by electrical power supplied via the common power line through which the motor communication part performs power line communication, or by electrical power obtained from a generator;
the first mode switching part switching the motor operation mode from a motor driving mode to a motor power generating mode in which the motor outputs electrical power that has been generated using rotation of the bicycle wheel upon a determination that communication between the motor communication part and the electrical bicycle component has stopped,
a stoppage time calculating part that calculates a time for which communication between the motor communication part and the electrical bicycle component is stopped, and
communication between the motor communication part and the electrical bicycle component being determined to have stopped upon the time calculated by the stoppage time calculating part being equal to or greater than a predetermined time.

15. A bicycle motor control system for controlling a motor for assisting rotation of a bicycle wheel, the bicycle motor control system comprising:
a motor communication part that performs power line communication with an electrical bicycle component through a common power line used to communicate both electrical power and information, the electrical bicycle component being actuated using electrical power that has been charged by a power source that is different from the motor, the electric bicycle component being configured to change a motor operation mode of the motor;
a first mode switching part operated either by electrical power supplied via the common power line through which the motor communication part performs power line communication, or by electrical power obtained from a generator, the first mode switching part switching the motor operation mode from a motor driving mode to a motor power generating mode in which the motor outputs electrical power that has been generated using rotation of the bicycle wheel upon a determination that communication between the motor communication part and the electrical bicycle component has stopped; and
a second mode switching part that switches the motor operation mode from the motor power generating mode to the motor driving mode based on the mode switching signal from the electrical bicycle component, the second mode switching part switching the motor operation mode from the motor power generating mode to the motor driving mode upon determination that communication has been possible for a predetermined time between the motor communication part for the motor and a communication part that communicates with the electrical bicycle component.

16. A bicycle motor control system for controlling a motor for assisting rotation of a bicycle wheel, the bicycle motor control system comprising:
a motor communication part that performs power line communication with an electrical bicycle component through a common power line used to communicate both electrical power and information, the electrical bicycle component being actuated using electrical power that has been charged by a power source that is different from the motor, the electric bicycle component being configured to change a motor operation mode of the motor;
a first mode switching part operated either by electrical power supplied via the common power line through which the motor communication part performs power line communication, or by electrical power obtained from a generator, the first mode switching part switching the motor operation mode from a motor driving mode to a motor power generating mode in which the motor outputs electrical power that has been generated using rotation of the bicycle wheel upon a determination that communication between the motor communication part and the electrical bicycle component has stopped;

a rotation detecting part that detects a state of rotation of the bicycle wheel; and a second mode switching part that switches the motor operation mode from the motor power generating mode to the motor driving mode based on the mode switching signal from the electrical bicycle component, the second mode switching part switching the motor operation mode from the motor power generating mode to the motor driving mode based on the state of rotation detected by the rotation detecting part upon a rotational speed of the wheel reaching a predetermined rotational speed or upon the distance over which the bicycle has traveled reaching a predetermined distance.

* * * * *